(12) United States Patent
Fowler

(10) Patent No.: US 10,125,231 B2
(45) Date of Patent: Nov. 13, 2018

(54) BENZOXAZINE CYANATE ESTER RESIN FOR PYROLISIS DENSIFICATION OF CARBON-CARBON COMPOSITES

(71) Applicant: RAYTHEON COMPANY, Waltham, MA (US)

(72) Inventor: Gray E. Fowler, Allen, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/277,080

(22) Filed: Sep. 27, 2016

(65) Prior Publication Data

US 2017/0096537 A1  Apr. 6, 2017

Related U.S. Application Data

(60) Provisional application No. 62/237,112, filed on Oct. 5, 2015.

(51) Int. Cl.
| | | |
|---|---|---|
| *C08J 5/24* | (2006.01) | |
| *B29B 13/02* | (2006.01) | |
| *C08L 101/16* | (2006.01) | |
| *C08L 79/04* | (2006.01) | |
| *C04B 35/626* | (2006.01) | |
| *C04B 35/83* | (2006.01) | |
| *B29K 303/04* | (2006.01) | |
| *B29K 307/04* | (2006.01) | |

(52) U.S. Cl.
CPC ............ *C08J 5/24* (2013.01); *B29B 13/02* (2013.01); *C04B 35/6269* (2013.01); *C04B 35/83* (2013.01); *C08L 79/04* (2013.01); *B29K 2303/04* (2013.01); *B29K 2307/04* (2013.01); *C04B 2235/602* (2013.01); *C04B 2235/6022* (2013.01); *C04B 2235/616* (2013.01); *C08J 2379/04* (2013.01); *C08L 2203/12* (2013.01); *C08L 2205/02* (2013.01)

(58) Field of Classification Search
CPC ........................................................ C08J 5/24
USPC ...... 264/29.1, 29.5, 241, 320, 347; 523/200; 428/688
See application file for complete search history.

(56) References Cited

U.S. PATENT DOCUMENTS

| | | |
|---|---|---|
| 5,152,939 A | 10/1992 | Ishida |
| 5,266,695 A | 11/1993 | Ishida |

(Continued)

FOREIGN PATENT DOCUMENTS

| | | |
|---|---|---|
| CN | 102643516 A | 8/2012 |
| CN | 103145437 A | 6/2013 |

(Continued)

OTHER PUBLICATIONS

Chinese Patent No. 102643516; Date of Publication: Aug. 22, 2012; Abstract Only, 2 pages.

(Continued)

*Primary Examiner* — Tae H Yoon
(74) *Attorney, Agent, or Firm* — Cantor Colburn LLP

(57) ABSTRACT

A method of forming carbon-carbon composites includes molding carbon fibers with a compound comprising a blend of benzoxazine resin and cyanate ester resin; and pyrolyzing the compound to form the carbon-carbon composite. A carbon-carbon composite includes carbon fibers impregnated with a compound comprising a blend of benzoxazine resin and cyanate ester.

19 Claims, 1 Drawing Sheet

(56) References Cited

U.S. PATENT DOCUMENTS

| | | | | |
|---|---|---|---|---|
| 5,973,144 | A * | 10/1999 | Ishida | C07D 265/16 |
| | | | | 544/105 |
| 7,709,579 | B2 * | 5/2010 | Lehmann | C08G 12/08 |
| | | | | 264/299 |
| 2012/0164900 | A1 * | 6/2012 | Reichwein | B29C 70/443 |
| | | | | 442/1 |
| 2013/0281640 | A1 * | 10/2013 | Tsubuku | C07C 261/02 |
| | | | | 525/528 |
| 2014/0154437 | A1 * | 6/2014 | Schroeder | B29C 53/602 |
| | | | | 428/34.1 |
| 2014/0212658 | A1 | 7/2014 | Fukuda et al. | |
| 2015/0141583 | A1 | 5/2015 | Arai et al. | |
| 2016/0185908 | A1 * | 6/2016 | Harriman | C08G 73/0233 |
| | | | | 428/114 |
| 2017/0008994 | A1 * | 1/2017 | Wang | C08J 5/24 |

FOREIGN PATENT DOCUMENTS

| | | |
|---|---|---|
| DE | 102011084626 A1 | 4/2012 |
| EP | 2336221 A1 | 6/2011 |
| JP | 2003003065 A | 1/2003 |
| WO | 2011161171 A1 | 12/2011 |

OTHER PUBLICATIONS

Chinese Patent No. 103145437; Date of Publication: Jun. 12, 2013; Abstract Only, 2 pages.

German Patent No. 102011084626; Date of Publication: Apr. 19, 2012; Abstract Only, 2 pages.

Japanese Patent No. 2003003065; Date of Publication: Jan. 8, 2003; Abstract Only, 1 page.

\* cited by examiner

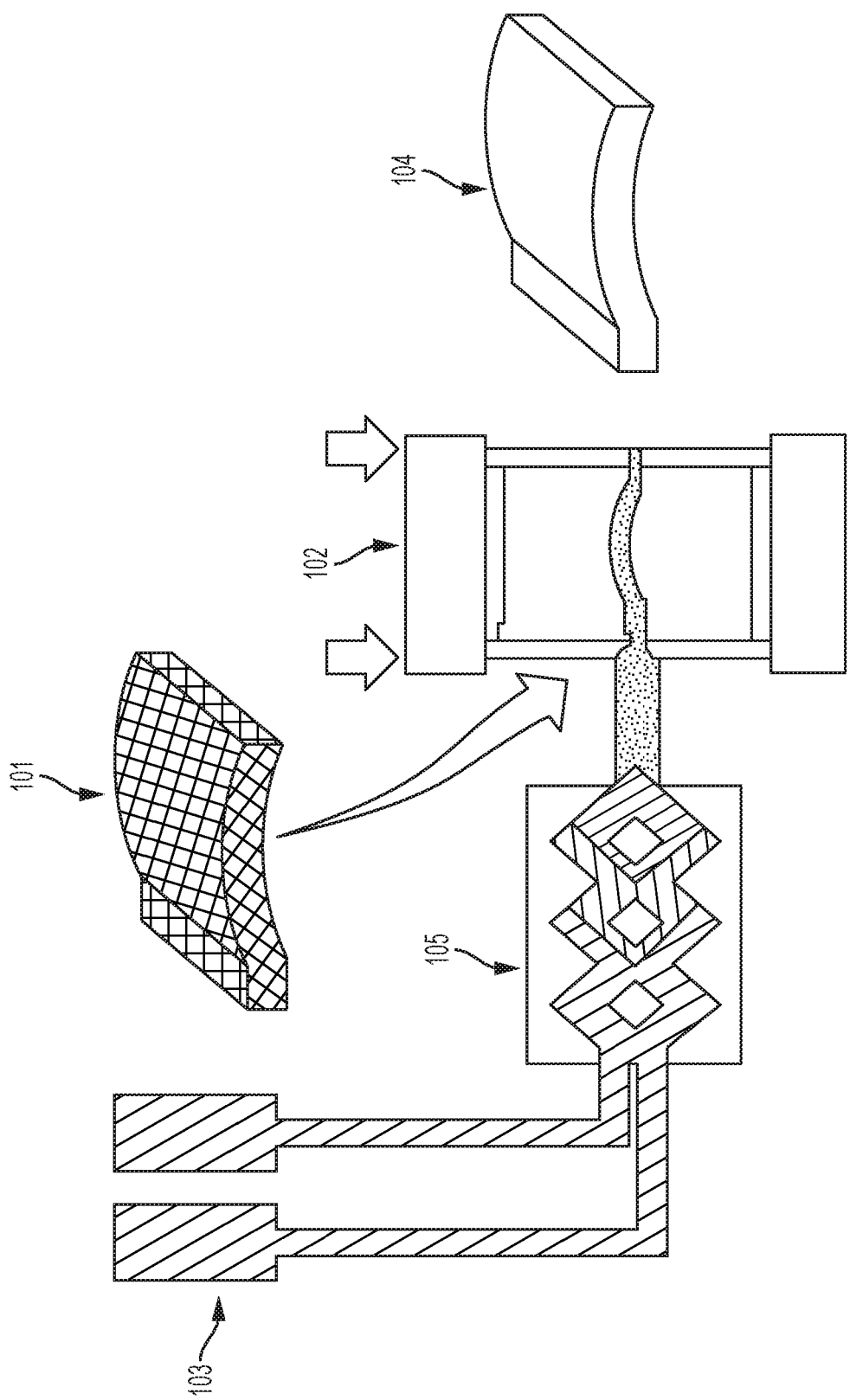

BENZOXAZINE CYANATE ESTER RESIN FOR PYROLISIS DENSIFICATION OF CARBON-CARBON COMPOSITES

CROSS REFERENCE TO RELATED APPLICATIONS

This application is a non-provisional of and claims priority to U.S. application Ser. No. 62/237,112, entitled "BENZOXAZINE CYANATE ESTER RESIN FOR PYROLOSIS DENSIFICATION OF CARBON-CARBON COMPOSITES", filed Oct. 5, 2015, which is incorporated herein by reference in its entirety.

BACKGROUND

The present disclosure relates to carbon-carbon composites, and more specifically, to material forming carbon-carbon composites.

Carbon-carbon composites have a wide variety of uses and can be formed in many different shapes. Carbon-carbon composites are known for exhibiting thermal stability in very high temperature environments. Carbon-carbon composites have a high thermal conductivity and low thermal expansion, as well as thermal stability as a solid, and the ability to resist thermal shock. As a result, carbon-carbon composites are able to retain a high level of strength and stiffness when exposed to high temperatures.

Carbon-carbon composites find use in aerospace applications, including rocket components, air frame components, nose cones, wing edges, other leading edges of space shuttles, brakes, etc. Carbon-carbon composites find further use in automobile racing applications where heavy steel breaks are replaced with lighter weight carbon-carbon composite disks.

Generally, carbon-carbon composites can be formed by arranging carbon fibers in a two, three, or four directional reinforcing structure. This structure is then impregnated with a carbon-containing compound functioning as a precursor for the carbon matrix. After impregnation, the structure is heated to produce a more dense fibrous structure wherein voids therebetween are at least partially filled with carbon resulting from pyrolysis of the precursor. This entire process is repeated multiple times (from 4 to 20 times) until the desired amount of densification has occurred.

SUMMARY

According to one embodiment, a method of forming carbon-carbon composites includes molding carbon fibers with a compound comprising a blend of benzoxazine resin and cyanate ester resin; and pyrolyzing the compound to form the carbon-carbon composite.

According to another embodiment, a carbon-carbon composite structure includes carbon fibers impregnated with benzoxazine resin having a char yield of greater than 65%.

According to another embodiment, a carbon-carbon composite includes carbon fibers impregnated with a compound comprising a blend of benzoxazine resin and cyanate ester.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1 is a method for making a composite material using resin transfer molding.

DETAILED DESCRIPTION

Existing manufacture of carbon-carbon (C—C) composites has an extremely long cycle time and is also very high cost. These problems are due in part to the use of phenolic resins and solvents in the densification (impregnation) process. The use of phenolic resins dominates the carbon-carbon industry. Phenolic resins are difficult to cure and are powdered solids at ambient temperatures. A phenolic-carbon fiber composite is first cured, then pyrolized. The resultant carbon-carbon composite has many voids throughout and requires multiple densification in order to fill the voids. Solid phenolic resins are dissolved in water and alcohol solvent at 50% to 70% solids. This liquid blend is forced into the carbon-carbon composite containing many voids throughout, cured, and then pyrolyzed. The efficiency of this process due to the use of non-productive solvent and the 55% char yield of phenolic is only about 25%. The densification step must be repeated 4 to 20 times until the required densification of the carbon-carbon composite is achieved. With the resin blend disclosed herein, the use of non-productive solvent can be eliminated or greatly reduced, resulting in a more efficient pyrolysis char yield which thereby reduces the number of process steps, cycle time, and overall cost of producing the carbon-carbon composite.

For example, a method of forming carbon-carbon composites can include molding carbon fibers with a compound including a blend of benzoxazine resin and cyanate ester resin and pyrolyzing the compound to form the carbon-carbon composite. The pyrolyzing of the compound can be repeated multiple times until the desired amount of densification of the carbon fibers is achieved, thereby creating the carbon-carbon composite. Before molding the carbon fibers can be in the form of two-dimensional preforms, three-dimensional preforms, or four-dimensional preforms. The molding can include resin transfer molding, reaction injection molding, vacuum infusion molding, vacuum bag autoclave molding, or compression molding. The blend of benzoxazine resin and cyanate ester resin can be impregnated as a resin, then cured, then pyrolyzed. Additional infusion after pyrolyzing can be accomplished using the blended resin. The processing temperature can be 150° F. to 175° F. (65° C. to 80° C.). The curing temperature can be 350° F. to 400° F. (175° C. to 205° C.).

With the method disclosed herein and carbon-carbon composites produced therefrom, at least 50% to 75% less solvent can be used to densify the carbon-carbon composite, making the overall process 45% to 50% more efficient.

The benzoxazine resin can be based on bisphenol A based benzoxazine resin, bisphenol F based benzoxazine resin, or a combination comprising at least one of the foregoing.

The carbon fibers can be impregnated with a benzoxazine resin have a char yield of greater than 65%. A char yield of the cyanate ester resin can be greater than or equal to 35%, for example, greater than or equal to 40, for example, greater than or equal to 45%, for example, greater than or equal to 47%. An average char yield of the blend of benzoxazine resin and cyanate ester resin can be 61%. A ratio of benzoxazine resin to cyanate ester resin the benzoxazine cyanate ester resin can be 60:40, for example, 70:30, for example, 80:20.

It can be advantageous for composite precursors to have a low viscosity and to be able to wet the surfaces of the carbon-carbon surface being impregnated with the composited material. Viscous materials are not desired because it can be difficult to impregnate the surfaces of the carbon-carbon especially as the interstices are smaller and smaller with each densification cycle.

Benzoxazine resin can have a char yield of 65%, which is 10% higher than the majority of phenolic resins. The viscosity of benzoxazine resin can be relatively high. In order to be used as a densification resin, benzoxazine can use a solvent similar to those used when a phenolic resin is used for densification. Alternatively, the benzoxazine resin can be combined with another, lower viscosity resin. For example, cyanate ester resins have low melt viscosity properties, as well as can have a low viscosity at ambient temperature (i.e., related to the immediate surroundings). For example, the cyanate ester resin can have a viscosity of 150 centipoise at room temperature. Benzoxazine and cyanate ester can be easily co-reacted to form a blend of benzoxazine and cyanate ester, which at slightly elevated temperatures, e.g., 150° F. to 175° F. (65 C to 80° C.), have a low enough viscosity to densify the carbon-carbon composite to be formed without the use of non-productive solvent. Once the carbon-carbon composite has been re-infiltrated with the blended resin, the benzoxazine and cyanate ester resin blend can be cured and pyrolized without the issue of trapped solvent, which creates the many voids present in the carbon-carbon process made with phenolic resin. The use of the blended resin of benzoxazine and carbonate ester as the densification resin for carbon-carbon composites eliminates or greatly reduces the non-productive (i.e., zero char yield) solvent used. The blended resin of benzoxazine and cyanate ester is process stable, but easily cured resulting in a process that beneficially has a 25% to 50% increase in char yield, a reduction in densification process steps, a reduction in cycle time, and a reduction in overall cost.

In some embodiments, the benzoxazine compound (4) may be formed by, for example, reacting a phenol (1), formaldehyde (2) (or paraformaldehyde), and a primary amine (3) as shown in the Reaction Scheme 1:

Reaction Scheme 1

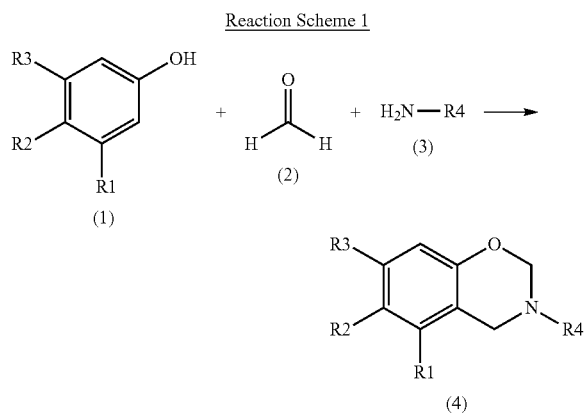

Reaction Scheme 1 illustrates an exemplary method of making a monomeric benzoxazine compound. In Reaction Scheme 1, R1, R2, and R3 are each independently a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, halogen, a carbonyl group, a S═O group, a O═S═O, a halogen, or any combination thereof.

In Reaction Scheme 1, R4 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof.

Any monomeric benzoxazine compounds may be combined to form a crosslinked compound including benzoxazine, a polymeric compound including benzoxazine, or a resin including benzoxazine. To form a benzoxazine polymer or resin, the benzoxazine is polymerized. The polymerization may include heating to open the oxazine ring.

In some embodiments, the benzoxazine compound is crosslinked to form a thermosetting polybenzoxazine. The crosslinking occurs through a ring opening mechanism. Crosslinked polybenzoxazines are formed from benzoxazine monomers having more than one benzoxazine ring.

Polybenzoxazines are polymers that include benzoxazine compounds. Polybenzoxazines include benzoxazine compounds or monomers that are functionalized. The benzoxazine monomers may include one, two, three, or more functional groups or reactive sites that promote crosslinking.

In some embodiments, the benzoxazine compounds are bi-functional benzoxazine compounds. Bi-functional benzoxazine compounds may crosslink after heating to form crosslinked benzoxazine resins.

In one embodiment, bi-functional benzoxazine compounds have the following structure:

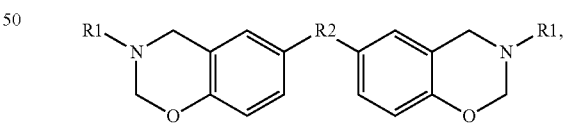

wherein R1 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof; and R2 is a single bond, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, halogen, a carbonyl group, a S═O group, a O═S═O, a halogen, or any combination thereof.

In one embodiment, the benzoxazine compound has the following structure:

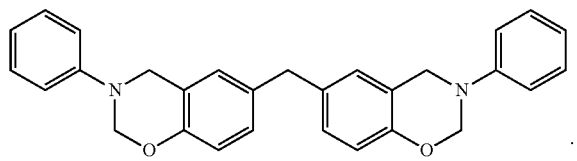 [SMILES: c1ccc(N2COc3ccc(Cc4ccc5c(c4)CN(c4ccccc4)CO5)cc3C2)cc1]

This benzoxazine compound is based on bisphenol F.

In some embodiments, a benzoxazine resin (2) is formed after heating a bi-functional benzoxazine (1) as shown in Reaction Scheme 2:

Reaction Scheme 2

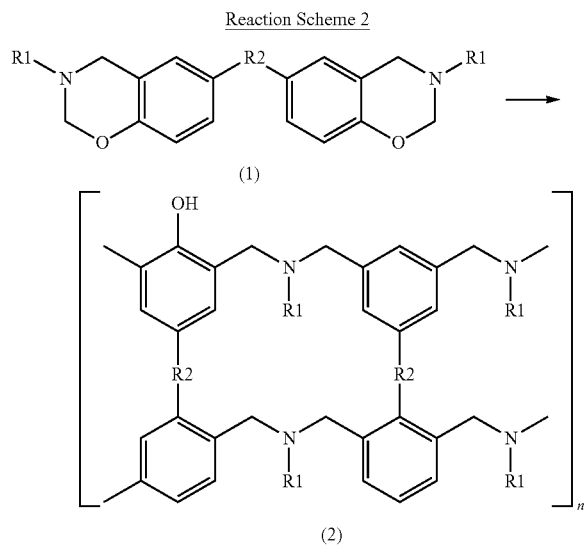

In Reaction Scheme 2, n is an integer from about 1 to about 2; R1 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof; and R2 is a single bond, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, halogen, a carbonyl group, a S═O group, a O═S═O, a halogen, or any combination thereof. In other embodiments, n is an integer greater than 2.

Non-limiting examples of benzoxazine resins include N-phenyl bisphenol A benzoxazine (commercially available as XU3560 from Huntsman Corporation, Salt Lake City, Utah); N-phenyl bisphenol F benzoxazine (commercially available as LBM6493 from Huntsman Corporation); N-phenyl phenolphtaleine benzoxazine (commercially available as LMB6490 from Huntsman Corporation); LOCTITE BZ 9110 AERO (Henkel Corporation, Düsseldorf, Germany), LOCTITE BZ 9120 AERO (Henkel Corporation), or any combination thereof.

In one embodiment, the benzoxazine composite material includes about 25 to about 45 weight % (wt. %) of the benzoxazine compound. In other embodiments, the benzoxazine composite material includes about 75 to about 99 wt. % of the benzoxazine compound. Yet, in other embodiments, the benzoxazine composite material includes about 35 to about 99 wt. % of the benzoxazine compound. Still yet, in other embodiments, the benzoxazine composite material includes an amount about or in any range from about 25, 30, 35, 40, 45, 50, 55, 60, 65, 70, 75, 80, 85, 90, and 95 wt. % of the benzoxazine compound.

The benzoxazine composite material can include reinforcing fibers. The reinforcing fibers can include carbon, silica, quartz, aramid, ceramic, or a combination thereof. The reinforcing fibers can include long fibers that have been pulled into alignment in substantially one direction. The reinforcing fibers can include portions of woven fabrics including continuous reinforcing fibers. The reinforcing fibers can include discontinuous short fibers. The reinforcing fibers can include portions of nonwoven fabrics.

A higher proportion of reinforcing fibers can be used in the benzoxazine composite, compared to phenolic composites.

In some embodiments, the benzoxazine composite material includes about 45 to about 62 vol. % (vol. %) of the reinforcing fibers. In other embodiments, the benzoxazine composite material includes about 48 to about 60 vol. % of the reinforcing fibers. Yet, in other embodiments, the benzoxazine composite material includes about 45 to about 70 wt. % of the reinforcing fibers, depending on density. Still yet, in other embodiments, the benzoxazine composite material includes an amount about or in a range from about 45, 50, 55, 60, 65, and 70 wt. % of the reinforcing fibers, depending on density.

In some embodiments, the benzoxazine composite material includes syntactic foam. The syntactic foam may be prepared from a resin. The syntactic foam may include, for example, glass, quartz micro balloons, quartz microspheres, or any combination thereof.

The benzoxazine composite material may include other polymers or compounds to form a blend. Non-limiting examples of other polymeric materials that may be included in the benzoxazine composite material include epoxy resins, cyanate esters, maleimides/bismaleimides, isocyanates, polyamides, phosphazenes, thermoplastics, acrylates, vinylmonomers, triazine compounds, anhydrides, or any combination thereof.

In cyanate ester resins, the hydrogen atom of the phenolic —OH group is substituted by a cyanide group (CN) with the resulting product with an —OCN group being named a cyanate ester. Cyanate ester resins can also be based a bisphenol, e.g., bisphenol A, bisphenol E, bisphenol F, etc.

The benzoxazine composite material may be produced by a method that includes directly impregnating the reinforcing fibers with the benzoxazine compound (e.g., a benzoxazine resin). Non-limiting examples of methods for making the benzoxazine composite include hand lay-up methods, filament winding methods, pultrusion methods, resin injection molding methods, and resin transfer molding methods.

FIG. 1 illustrates a method of making the composite material using a resin transfer molding method according to exemplary embodiments. First, reinforcing fibers are dried into a preformed fiber structure 101. The preformed fiber structure 101 is disposed into a desired mold 102. A benzoxazine resin cyanate ester resin blend (e.g., benzoxazine composite material layer) 103 is prepped, mixed, and inserted into the mold 102 along with the preformed fiber structure 101. The insertion may take place using a standard extruder 105. The reinforcing fibers of the preformed fiber structure 101 and the benzoxazine resin cyanate ester resin blend 103 are cured (not shown) to provide the final composite structure/part 104. In an exemplary embodiment, the curing can be performed at a temperature in of about 175° C. to about 220° C. for about 2 to about 4 hours.

The carbon used in preparing the carbon-carbon composites with the benzoxazine and cyanate ester resin blend can be filamentary, i.e., carbon fibers having unidirectional, two-directional, three-directional, or multi-directional arrangements. The carbon fibers are impregnated with the benzoxazine carbonate ester blend by any number of techniques including dipping, spraying, painting, etc. Afterward, the carbon structure is subjected to carbonization by pyrolysis at 750° C. to 1,000° C. for a period of time that can be greater than or equal to three days. Heating is carried out in an inert atmosphere (e.g., under nitrogen) and the carbon-carbon composite is cooled to room temperature. After cooling, the densification (i.e., impregnation) process begins again with the benzoxazine cyanate ester resin blend.

As described herein, the benzoxazine part 104 may be a portion of a rocket nozzle, a portion of an airframe application, a portion of a space shuttle (e.g., tile, sheet), brakes (e.g., aircraft brakes or vehicle (e.g., race car) breaks) or a part in any shape or size.

In addition to the benzoxazine composite material layer 103 and the substrate (e.g., preformed fiber structure) 101, the heat shield may include other layers. One or more layers of the benzoxazine composite material layer 103 may be disposed onto the substrate 101. Other layers may be inserted between the benzoxazine composite material layer 103 and the substrate 101. Layers also may be disposed directly onto the benzoxazine composite material layer 103.

The benzoxazine composite materials provide a continuous surface of the carbon-carbon composite. The benzoxazine composite material is an ablative continuous surface that can withstand, for example, severe re-entry environments. The benzoxazine composite material can withstand high pressures, for example, pressures greater than 0.2 atmospheres. The benzoxazine composite material can also withstand heating, for example, in a range from about 100 to about 1000 Watts/centimeter$^2$ (W/cm$^2$).

In some embodiments, the carbon-carbon composites can be attached to a spacecraft, such as a sample return capsule, to provide thermal protection for the spacecraft during atmospheric re-entry. In other embodiments, the carbon-carbon composites can be used as blast shields to protect from motor exhaust. Yet, in other embodiments, the carbon-carbon composites can be used as firewalls in buildings and mobile transportation devices, for example, in aircrafts, spacecrafts, automobiles (e.g., race cars), submarines, and ships (e.g., navy vessels).

The composites and methods of forming disclosed herein include at least the following embodiments:

Embodiment 1

A method of forming carbon-carbon composites, comprising: molding carbon fibers with a compound comprising a blend of benzoxazine resin and cyanate ester resin; and pyrolyzing the compound to form the carbon-carbon composite.

Embodiment 2

The method of Embodiment 1, wherein the molding is selected from resin transfer molding, reaction injection molding, vacuum infusion molding, vacuum bag autoclave molding, or compression molding.

Embodiment 3

The method of Embodiment 2, wherein the molding is resin transfer molding.

Embodiment 4

The method of any of Embodiments 1-3, further comprising curing the blend of benzoxazine resin and cyanate ester resin at a temperature of 350° F. to 400° F. (175° C. to 205° C.).

Embodiment 5

The method of any of Embodiments 1-4, further comprising repeating the pyrolysis of the compound multiple times to densify the carbon-carbon composite.

Embodiment 6

The method of any of Embodiments 1-5, wherein the carbon fibers comprise a 3-dimensional or a 4-dimensional fiber preform before molding.

Embodiment 7

A carbon-carbon composite structure, comprising: carbon fibers impregnated with benzoxazine resin having a char yield of greater than 65%.

Embodiment 8

The carbon-carbon composite structure of Embodiment 7, wherein the benzoxazine resin comprises bisphenol A based benzoxazine resin, bisphenol F based benzoxazine resin, or a combination comprising at least one of the foregoing.

Embodiment 9

The carbon-carbon composite structure of Embodiment 7 or Embodiment 8, wherein the benzoxazine resin comprises bisphenol F based benzoxazine resin.

Embodiment 10

The carbon-carbon composite structure of any of Embodiments 7-9, wherein the benzoxazine resin comprises the formula:

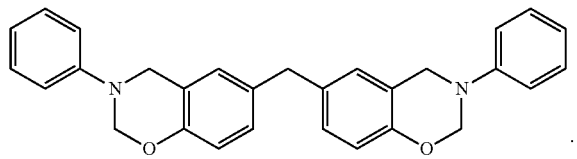 [SMILES: c1ccc(N2COc3ccc(Cc4ccc5c(c4)CN(c4ccccc4)CO5)cc3C2)cc1]

Embodiment 11

The carbon-carbon composite structure of any of Embodiments 7-10, wherein a char yield of the benzoxazine resin is greater than 65%.

Embodiment 12

A carbon-carbon composite, comprising: carbon fibers impregnated with a compound comprising a blend of benzoxazine resin and cyanate ester.

Embodiment 13

The carbon-carbon composition of Embodiment 12, wherein the carbon fibers comprise a 3-dimensional or a 4-dimensional fiber preform.

Embodiment 14

The carbon-carbon composite of Embodiment 12 or Embodiment 13, wherein the benzoxazine resin comprises bisphenol A based benzoxazine resin, bisphenol F based benzoxazine resin, or a combination comprising at least one of the foregoing.

Embodiment 15

The carbon-carbon composite of any of Embodiments 12-14, wherein the benzoxazine resin comprises bisphenol F based benzoxazine resin.

Embodiment 16

The carbon-carbon composite of any of Embodiments 12-15, wherein the benzoxazine resin comprises the formula:

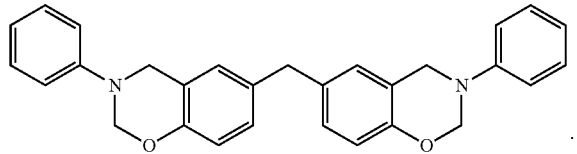 [SMILES: c1ccc(N2COc3ccc(Cc4ccc5c(c4)CN(c4ccccc4)CO5)cc3C2)cc1]

Embodiment 17

The carbon-carbon composite of any of Embodiments 12-16, wherein the cyanate ester resin comprises bisphenol A based cyanate ester resin, bisphenol E based cyanate ester resin, bisphenol F based cyanate ester resin, or a combination comprising at least one of the foregoing.

Embodiment 18

The carbon-carbon composite of any of Embodiments 12-17, wherein a char yield of the benzoxazine based resin is greater than 65%.

Embodiment 19

The carbo-carbon composite of any of Embodiments 12-18, wherein a char yield of the cyanate ester resin is greater than or equal to 45%.

Embodiment 20

The carbon-carbon based composite of any of Embodiments 12-19, wherein a ratio of benzoxazine resin to cyanate ester resin is 80:20.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

Unless otherwise specified herein, any reference to standards, regulations, testing methods and the like, such as ASTM D1003, ASTM D4935, ASTM 1746, FCC part 18, CISPR11, and CISPR 19 refer to the standard, regulation, guidance or method that is in force at the time of filing of the present application.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of forming carbon-carbon composites, comprising:
   molding carbon fibers with a compound comprising a blend of benzoxazine resin and cyanate ester resin, wherein a char yield of the benzoxazine based resin is greater than 65%; and
   pyrolyzing the compound to form the carbon-carbon composite;
   wherein a ratio of benzoxazine resin to cyanate ester resin is 80:20.

2. The method of claim 1, wherein the molding is selected from resin transfer molding, reaction injection molding, vacuum infusion molding, vacuum bag autoclave molding, or compression molding.

3. The method of claim 2, wherein the molding is resin transfer molding.

4. The method of claim 1, further comprising curing the blend of benzoxazine resin and cyanate ester resin at a temperature of 350° F. to 400° F. (175° C. to 205° C.).

5. The method of claim 1, further comprising repeating the pyrolysis of the compound multiple times to densify the carbon-carbon composite.

6. The method of claim 1, wherein the carbon fibers comprise a 3-dimensional or a 4-dimensional fiber preform before molding.

7. A carbon-carbon composite, comprising:
   carbon fibers impregnated with a compound comprising a blend of benzoxazine resin and cyanate ester, wherein a char yield of the benzoxazine based resin is greater than 65%;

wherein a ratio of benzoxazine resin to cyanate ester resin is 80:20.

8. The carbon-carbon composition of claim 7, wherein the carbon fibers comprise a 3-dimensional or a 4-dimensional fiber preform.

9. The carbon-carbon composite of claim 7, wherein the benzoxazine resin comprises bisphenol A based benzoxazine resin, bisphenol F based benzoxazine resin, or a combination thereof.

10. The carbon-carbon composite of claim 9, wherein the benzoxazine resin comprises bisphenol F based benzoxazine resin.

11. The carbon-carbon composite of claim 10, wherein the benzoxazine resin comprises the formula:

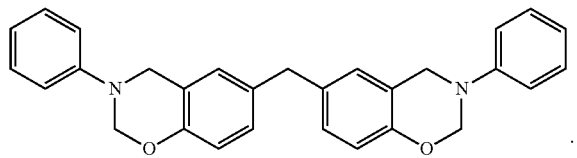 [SMILES: c1ccc(N2COc3ccc(Cc4ccc5c(c4)CN(c4ccccc4)CO5)cc3C2)cc1]

12. The carbon-carbon composite of claim 7, wherein the cyanate ester resin comprises bisphenol A based cyanate ester resin, bisphenol E based cyanate ester resin, bisphenol F based cyanate ester resin, or a combination thereof.

13. The carbon-carbon composite of claim 7, wherein a char yield of the cyanate ester resin is greater than or equal to 45%.

14. The method of claim 1, wherein a processing temperature for the molding is 150° F. to 175° F. (65° C. to 80° C.).

15. A carbon-carbon composite, comprising:
carbon fibers impregnated with a compound comprising a blend of benzoxazine resin and cyanate ester, wherein a char yield of the benzoxazine based resin is greater than 65%, wherein an average char yield of the blend of benzoxazine resin and cyanate ester resin is 61%.

16. The carbon-carbon composite of claim 15, wherein the benzoxazine resin comprises bisphenol A based benzoxazine resin, bisphenol F based benzoxazine resin, or a combination thereof.

17. The carbon-carbon composite of claim 16, wherein the benzoxazine resin comprises bisphenol F based benzoxazine resin.

18. The carbon-carbon composite of claim 17, wherein the benzoxazine resin comprises the formula:

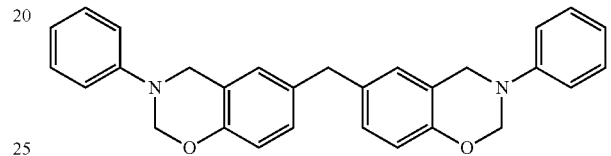

19. The carbon-carbon composite of claim 15, wherein the cyanate ester resin comprises bisphenol A based cyanate ester resin, bisphenol E based cyanate ester resin, bisphenol F based cyanate ester resin, or a combination thereof.

* * * * *